United States Patent [19]
Akisato

[11] 4,004,798
[45] Jan. 25, 1977

[54] PHOTOCOPYING MACHINE SHEET SEPARATION DEVICE

[75] Inventor: Naohiro Akisato, Toyokawa, Japan

[73] Assignee: Minolta Camera Kabushiki Kaisha, Osaka, Japan

[22] Filed: Mar. 31, 1976

[21] Appl. No.: 672,537

[30] Foreign Application Priority Data

Apr. 8, 1975   Japan ................... 50-47737[U]

[52] U.S. Cl. .................. 271/172; 271/275
[51] Int. Cl.² ........................ B65H 29/64
[58] Field of Search ........... 271/172, 227, 243, 275

[56] References Cited
UNITED STATES PATENTS 3,452,980  7/1969  Yanagawa ................ 271/172
3,493,227  2/1970  Yanagawa ................ 271/172

Primary Examiner—Richard A. Schacher
Attorney, Agent, or Firm—Wenderoth, Lind & Ponack

[57] ABSTRACT

A sheet separation device has a copy sheet guide which directs a sheet of copy paper to means for forwarding copy paper to requisite stages subsequent to an exposure stage. The copy sheet guide is engageable by a stop which is disengaged by the leading edge of a sheet of copy paper, and the guide is rotatable by an independent drive source which is not effective until disengagement of the stop, whereby less force is required to be applied by the copy paper to disengage the stop.

12 Claims, 14 Drawing Figures

PHOTOCOPYING MACHINE SHEET SEPARATION DEVICE

The present invention relates to a sheet separation device suited for use in a photocopying machine.

In a known type of photocopying machine an original document of transparent material and a sheet of photosensitive copy paper are placed in flat contact with one another by an operator, and then supplied automatically together through an exposure system wherein a latent image of the original document is produced on the copy paper, after which the original document and exposed copy paper are separated, the original document being supplied directly to an outlet of the photocopying machine, and the exposed copy paper being supplied to an outlet of the photocopying machine after being passed through image developing and fixing stages. Transport of the original document and copy paper together or independently through the photocopying machine can be effected in a comparatively straightforward manner by a roll and conveyor belt means, but separation of the original document and the copy paper is more difficult and frequently presents problems with respect to maintenance and functioning of the machine.

There are known vacuum means for sheet separation, but such means have the disadvantage that photocopying machine construction is rendered complex, and also that such means are unsuited to use in smaller photocopying machines, and it is accordingly preferred to provide photocopying machines with mechanical sheet separation means which require less independent equipment and are more compact. In conventional sheet separation means, such as disclosed in U.S. Pat. Nos. 3,452,980 and 3,493,227, for example, subsequent to passage through the exposure system a sheet of copy paper and an original document are passed through a pair of slippage rolls which are, at least during initial passage of the original document and copy paper therethrough, rotated at different speeds, the roll which contacts the copy paper being rotated faster than the other roll, whereby a leading edge portion of the copy paper is moved clear of the original document. Subsequent to the slippage rolls there are provided rollers or similar transport means which are generally level with the slippage rolls and onto which the original document may fall under its own weight to be transported to the exterior of the photocopying machine, and a sheet separation and copy paper transport means comprising a rotary guide drum, disc or plate means which has at least a peripheral notched portion into which the leading edge of the copy paper may enter, and at least one stop portion which is normally engaged by one arm of a pivotally mounted bell crank lever, and which is mounted through spring means on a drive shaft which is rotated simultaneously with the slippage rolls. Upon entering the notched portion of the rotary drum or similar means the leading edge portion of the copy sheet contacts the other arm of the bell crank lever which is thereupon pivoted out of its normal position and disengages the rotary guide means which may thus be rotated by the drive shaft and carry the sheet of copy paper to transport means for carrying the copy paper through development and fixing systems and to the exterior of the photocopying machine. A principal disadvantage of such conventional sheet separation means is that since the rotary drum and guide means is constantly urged to rotate during transport of copy paper through the photocopying machine, in order to cause disengagement of the rotary drum stop means constituted by the bell crank lever, a sheet of copy paper must exert sufficient force to overcome not only the restoring force of the bell crank lever, which may be comparatively small, but also the urging force imposed on the rotary guide means by the drive shaft, which is much larger. Because of this, there are frequently problems of failure of the copy paper to disengage the bell crank lever, with the result that the copy paper is either removed via the original document transport means, or jams in the photocopying machine. Another problem associated with such conventional means is that it is comparatively easy for an original document to enter the peripheral notch portion of the rotary guide drum, since, although an original document is generally somewhat less rigid than a sheet of copy paper and ideally should fall away from the guide drum, frictional pressure imposed on the copy paper and original document during passage thereof through the slippage rolls produces a certain amount of electrostatic attraction which is often sufficient to cause adherence of the original document to the copy paper until the leading end portions of both the original document and the copy paper have entered the notched peripheral portion of the rotary guide means, with the result that the original document also is carried through the image development and fixing stages and that there is failure to obtain a developed copy and there is also possible jamming in the photocopying machine. A further disadvantage with this means is that since the guide means is driven by a shaft acting through a spring means, after use for a certain time there is liable to be variation in the amount of movement imparted to the guide drum by a given degree of rotation of the drive shaft, and the guide means may therefore fail to be returned to a position in which the peripheral notched portion thereof is engageable by a succeeding sheet of copy paper.

In another conventional means disclosed in Japanese Utility Model Publication No. 48-10440 there is provided a deflector element having a pivotally mounted upper end and a lower end portion defining a portion which is engageable by the leading edge of a sheet of copy paper. As it leaves a pair of slippage rolls a sheet of copy paper engages and pushes this engagement portion of the deflector element whereby the deflector element is pivoted and the engagement portion thereof is moved along a circular path to the location of transport means for carrying the copy paper through necessary subsequent stages, the deflector element thus acting as a guide for the copy paper and being moved in a requisite manner by the copy paper itself. While this means has the advantage of simplicity of construction, there is the drawback that since the deflector element must be moved by a sheet of copy paper, the restoring force normally applied to move the deflector element back into position for engagement thereof by a succeeding sheet of copy paper may be only very small, and return movement of the deflector element is therefore particularly liable to be affected by dust or other foreign matter, even a small amount of which may be sufficient to prevent correct return movement of the deflector element. This means therefore presents problems relating to maintenance. In addition, there is the abovenoted disadvantage that it is possible for an original document to be retained, due to the effect of static electricity, in adherence to a sheet of copy paper until the copy paper engages the deflector element, with the result that the original document is transported together with the copy paper to the subsequent transport means.

It is accordingly an object of the invention to provide a photocopying machine sheet separation device which is easily actuable by a sheet of copy paper, but is accurately returned by external drive means to a position for engagement of a succeeding sheet of copy paper.

It is another object of the invention to provide a photocopying machine sheet separation device which improved effect and insures separation of an original document and a sheet of copy paper, regardless of temporary adherence of such material subsequent to exit thereof from slippage rolls.

It is another object of the invention to provide a sheet separation device which is of simple construction and may be easily incorporated in a small-size photocopying machine.

In accomplishing these and other objects there is provided according to the present invention a sheet separation means comprising a pair of slippage rolls through which an original document and a sheet of copy paper in surface-to-surface contact are passed subsequent to passage through an exposure system, rotary drum means which is driven simultaneously with actuation of the slippage rolls, is provided above the slippage rolls, and transports the copy paper to a subsequent stage, and a copy paper engagement and guide means which has a peripheral notch portion for engagement of the leading edge portion of a sheet of copy paper and is freely rotatable about the rotary axis of the transport drum means, and has fixedly attached thereto a gear wheel means which is engageable by drive means actuated simultaneously with the transport drum drive means, the copy sheet engagement portion of the guide means being moved along a circular path following the periphery of the transport drum. The gear wheel means attached to the copy paper guide means does not have teeth over the entire periphery thereof but includes an untoothed peripheral portion which is not engageable by the gear drive means. Normally, i.e., when sheet separation action is not required to be effected, the copy paper guide means is held by a stop means comprised of a bell crank lever in a position such that the copy paper engagement portion thereof is adjacent to the slippage rolls and that the untoothed portion of the gear wheel means attached to the copy paper guide means faces the gear drive means, whereby no drive effort is exerted on the copy paper guide means. When the copy paper guide means is retained in this position, the center of gravity thereof is not in a vertical line with the rotary center thereof. The stop means is swung out of engagement with the copy paper guide means by a sheet of copy paper leaving the slippage rolls. When thus disengaged from the stop means, the copy paper guide means rotates to a position of equilibrium, and upon, or slightly before reaching this position, the guide means turns the gear wheel means fixedly attached thereto to an angular position wherein the toothed portion of the gear wheel means is engaged by the currently rotating gear drive means, which thus forcibly effects continued rotation of the guide means, the peripheral speed of the guide means during this forced rotation being initially less than that of the slippage roll which contacts the sheet of copy paper, whereby the engagement portion of the guide means is gradually moved away from the location of the slippage rolls, but the leading edge of the copy paper moves away from the location of the slippage rolls at a faster rate and so gradually enters the engagement portion of the guide means. The distance from the slippage rolls at which the leading edge portion of the copy paper is completely engaged in the engagement portion of the copy paper guide means is greater than an original document, which is generally less rigid, can extend when unsupported, whereby only the copy paper is engaged, the original document falling naturally to be transported to the exterior of the photocopying machine.

In another embodiment of the invention, in order to counter possible adherence of an original document to a sheet of copy paper due to electrostatic attraction there is further provided a pawl or similar means which contacts the side of the copy paper which is external with respect to the transport drum means and so further insures detachment of the original document from the copy paper.

The guide means continues to be rotated simultaneously with the transport drum until at least the leading edge portion of the copy paper has been brought into engagement with forwarding means for forwarding the copy paper to a next stage. Further rotation of the guide means beyond this point brings the untoothed portion of the gear wheel means opposite the gear drive means.

In the means of the invention, since a copy paper guide means is rotated by external drive means and this rotation is effected entirely independently of rotation of a copy paper transport means, rotation of the guide means requires no exertion of force by the copy paper, in order to disengage stop means from the guide means, i.e., to actuate the sheet separation means, the copy paper does not have to exert a force sufficient to overcome rotary force imposed on the guide means. In other words, the actuation force required to be exerted by the copy paper is much less, thus avoiding problems of possible jamming of paper in the photocopying machine, in addition to which there are no problems of variation of the rotary speed of the guide means.

In a copying machine through which documents and copy paper are transported at different speeds, which are selected in accordance with factors such as the density of an original document it is required to obtain a copy, for example, if the copy paper guide means is always moved at the same initial speed upon disengagement of the stops, as is the case when this initial movement is due to a constant weight, there is the disadvantage that the engagement portion of the guide means may not always be brought to a correct position for engagement of the leading edge portions of sheets of copy paper leaving the slippage rolls at different speeds, since there may be quite a large difference between the fastest and slowest speed of transport of documents and copy paper through the photocopying machine. In another embodiment of the invention for employment in such a photocopying machine, initial movement of the guide means a sufficient distance to bring the toothed portion of the gear wheel means into engagement with the gear drive means is effected by a lever means which contacts a stud attached to the guide means and is rotated by the same drive means as employed for drive of the transport drum means, whereby initial movement of the guide means is always effected at a speed proportional to that of other elements in the photocopying machine.

A better understanding of the present invention may be had from the following full description of several preferred embodiments thereof when read in reference to the attached drawings, in which like numerals refer to like parts, and FIG. 1 is a cross-sectional view of a photocopying machine incorporating a sheet separation means according to one preferred embodiment of the invention;

Figure 1:
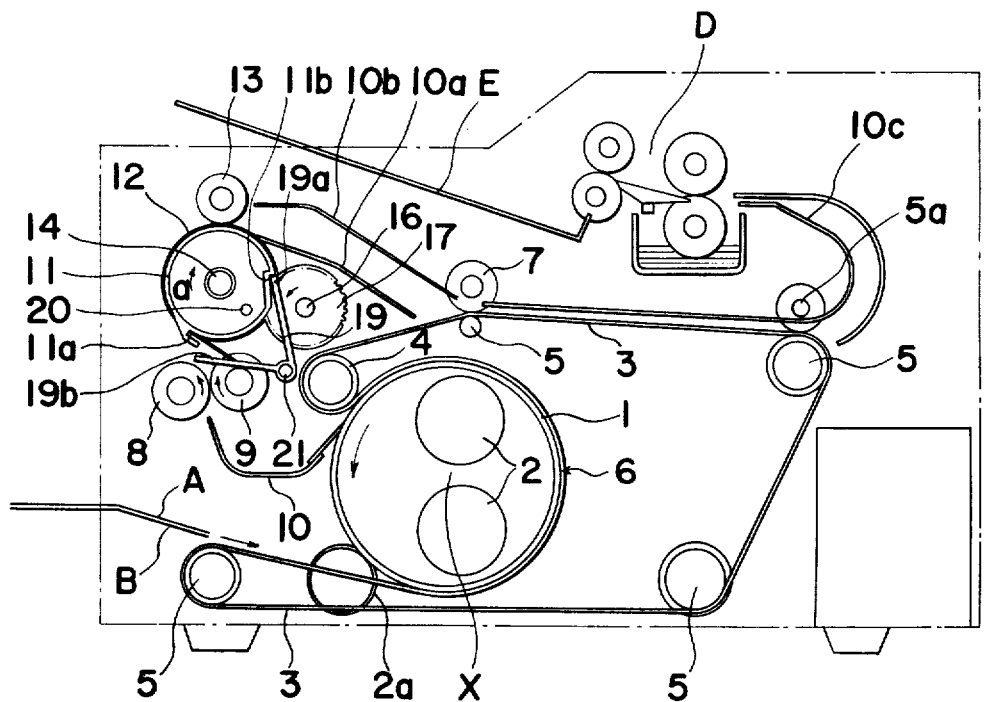

Referring first to FIG. 1, lamps 2 or similar light source are provided inside a transparent rotary drum 1 which is rotatable around a central axis $x$ not shown and rides against a bearing roller 2a, and around which is passed an endless transport belt 3 which is driven by a drive roll 4 and also passes around guide rolls 5, the drum 1 being rotated counterclockwise as seen in the drawing upon actuation of the drive roll 4. A transparent original document A and a sheet of photosensitive copy paper B, while in surface-to-surface contact, are supplied onto a lower stretch defined by the transport belt 3 and are transported by the belt 3 around a peripheral portion of the transparent drum 1 defining an exposure area 6 whereat while the original document A and copy paper B are held firmly against the periphery of the drum 1 by the belt 3 the lamps 2 are actuated whereby a latent image of the content of the original document A is formed on the copy paper B, the drive roll 4 being positioned adjacent to the transparent drum 1 at the exit of the exposure area 6. Upon leaving the exposure area 6 the original document A and copy paper B are together moved into an area defined by a downwardly concave, curved guide 10 by which they are directed to a pair of slippage rolls 8 and 9, which are concurrently rotated, the original document A being contacted by roll 8 and the copy paper B by roll 9.

Figure 2:
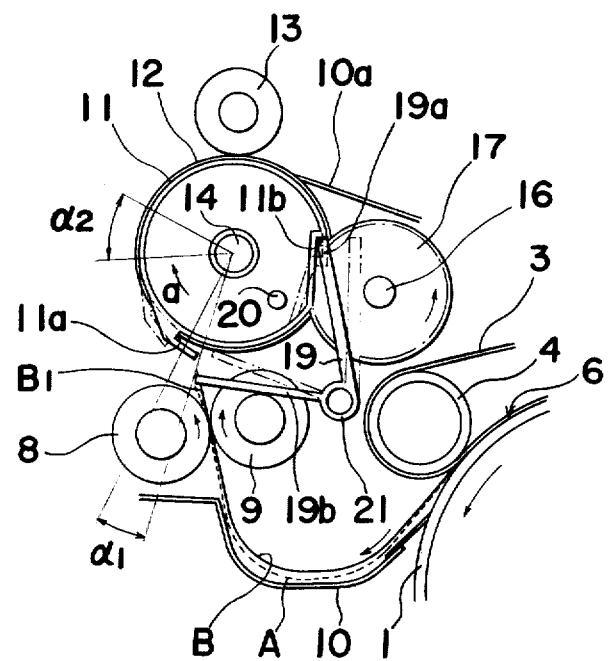
FIGS. 2 through 4 are detail views illustrating action of the sheet separation means of FIG. 1.
Figure 3:
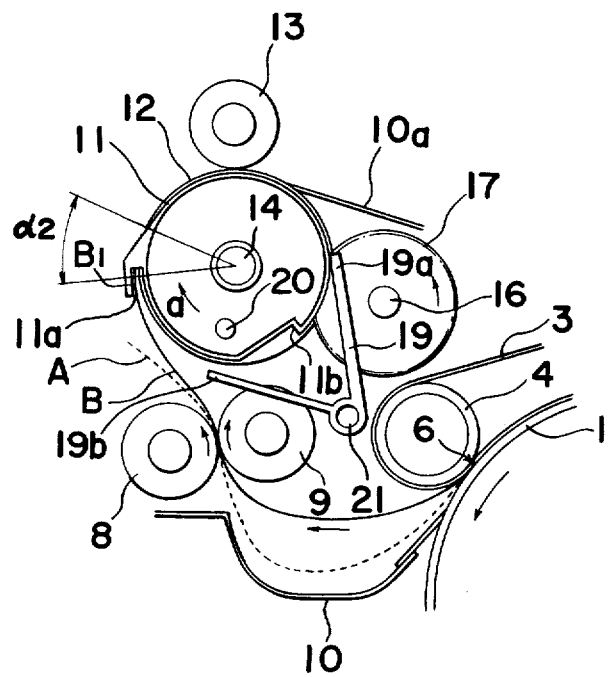
Figure 4:
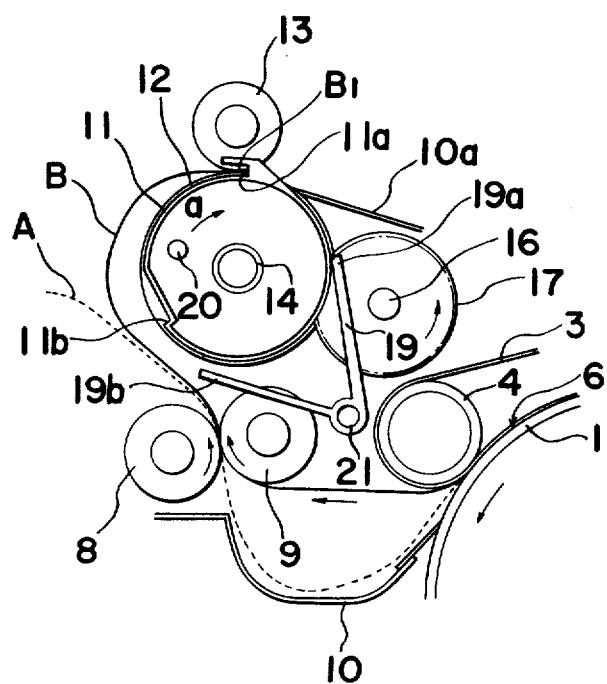

Roll 9 is provided on the right of roll 8 as seen in the drawing and is initially rotated faster than roll 8, whereby the copy paper B is drawn through the rolls 8 and 9 faster than the original document A. Therefore, as shown in FIG. 2, the leading edge of the copy paper B, indicated by a solid line, precedes that of the original document A, indicated by a dashed line, as the document A and paper B first leave the slippage rolls 8 and 9. Having reference to the ratio of speeds of the rolls 8 and 9 and the rigidity of the material of copy paper B, the line along which the original document A and copy paper B are passed through the rolls 8 and 9 is at an angle to the vertical such that an unsupported leading edge portion of the copy paper B leaving the rolls 8 and 9 inclines to the left as seen in the drawing. As the original document A and copy paper B continue to be fed through the rolls 8 and 9, whereas that portion of the original document A which is between the drive roll 4, i.e., the exit of the exposure area 6, and the entry of the rolls 8 and 9 still follows the general contour of the concave guide 10, the corresponding portion of the copy paper B gradually straightens out as illustrated in FIGS. 3 and 4. When, or slightly before, this portion of the copy sheet B defines a straight line as shown in FIG. 4, suitable detection means such as disclosed in U.S. Pat. No. 3,493,227 is actuated and causes termination of separate drive supplied to the roll 9, whereby subsequently the roll 9 is driven by, and hence at the same speed as, the roll 8, and the original document A and copy paper B are fed at the same speed through the rolls 8 and 9, thereby avoiding imposition of tension on the copy paper B.

Figure 5:
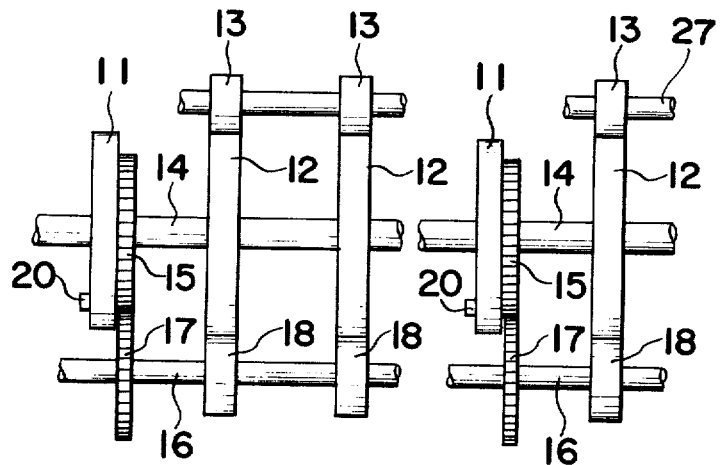
FIG. 5 is a plan view showing the mode of drive of a copy paper guide means and transport drum means included in the sheet separation means of FIG. 1.

Referring back to FIG. 1, and also referring to FIG. 5, above the slippage rolls 8 and 9 there is provided a transport drum 12 which is fixedly mounted on a rotatable shaft 14 disposed parallel to the axis of rotation of the roll 8 and roll 9, and a rotary separator guide 11 which is slightly spaced from the transport drum 12 and is mounted on and is freely rotatable around the shaft 14, the separator guide 11 thus being rotatable independently of the transport drum 12. The transport drum 12 may be constituted by two or more parallel discs as shown in FIG. 5, or may of course be a unitary element, and the rotary separator guide 11 may be constituted by a pair of discs on opposite sides of the transport drum 12, although only one such disc is shown in FIG. 1 and referred to in the description below. In pressure contact with an upper peripheral portion of each element constituting the transport drum 12 there is provided a freely rotatable forwarding roll 13 which acts in cooperation with the transport drum 12 to feed a sheet of copy paper B along a chute means 10a, above which there is provided a retaining guide 10b onto an upper stretch of the transport belt 3 and into engagement with a forwarding roller 7 and a guide roller 5a provided on opposite sides of the belt 3, the copy paper B being forwarded by the transport belt 3 and other suitable forwarding means to a developing and fixing station indicated generally at D in the drawing, and then being moved to the exterior E of the photocopying machine.

In FIG. 1, the outer periphery of the separator guide 11 has a notched portion 11a which is generally tangential with respect to the periphery of the guide 11 and in which the leading edge B1 of a copy sheet B may be engaged and a stepped portion 11b which is engageable by the outer end of one arm 19a of a stop 19 having the general form of a bell crank lever which is pivotally mounted on a fixed pin 21, rotation of the guide 11 being prevented when the stepped portion 11b thereof is thus engaged. When unopposed, the stop 19 naturally pivots into a position in which the arm 19a thereof will engage the stepped portion 11b of the guide 11. When the guide 11 is thus engaged the notched portion 11a thereof is positioned approximately directly above the junction of the slippage rolls 8 and 9 and is inclined with respect to the line followed by a copy sheet B exiting from the rolls 8 and 9, and the outer end portion of the other arm 19b of the stop 19 extends between the junction of the rolls 8 and 9 and the guide notched portion 11a, whereby the leading edge B1 of the sheet of copy paper B exiting from the rolls 8 and 9 will contact the stop arm 19b and cause the stop 19 to pivot clockwise as seen in the drawing to a position in which the stop arm 19a is moved out of engagement with the guide stepped portion 11b, this action being effected prior to arrival of the copy paper leading end B1 at the periphery of the guide 11. Attached to the guide 11 there is a small weight 20, which, when the guide 11 is engaged by the stop 19, is disposed out of vertical alignment with the shaft 14, to the right thereof as seen in FIG. 1, and which, when the stop 19 is disengaged from the guide 11, exerts a force to pivot the guide 11 clockwise.

Figure 6:
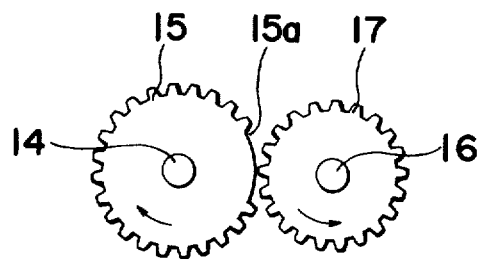
FIG. 6 is a detail view of drive means for a copy paper guide means.

In FIGS. 1, 5, and 6 the discs constituting the transport drum 12 are driven by rollers 18 which are in pressure contact therewith and which are fixedly mounted on a rotary shaft 16 which is suitably caused to rotate during the whole time the slippage rolls 8 and 9 are actuated. The speed of rotation of the shaft 16 is such that the peripheral speed of the transport drum 12, and hence of the forwarding roller 13, is always equal to that of the initially slower slippage roll 8. Fixedly attached to the copy paper guide 11 there is a gear wheel 15 which is freely rotatable about the transport drum shaft 14 and which, as shown most clearly in FIG. 6, comprises a toothless peripheral portion 15a. The toothed portion of the gear 15 is engageable by a drive gear wheel 17 which is fixedly mounted on the drive roll shaft 16. When the guide 11 is engaged by the stop 19, the toothless portion 15a of the gear wheel 15 faces the drive wheel 17, which, therefore, even if rotating, will not drive the gear wheel 15. When, however, the stop 19 releases the guide 11 and the guide 11 is caused to rotate clockwise due to the action of the weight 20 as described above, the toothed portion of the gear wheel is brought into engagement with the drive wheel 17, which will now therefore drive the gear wheel 15 and so cause rotation of the guide 11.

The rotary speed of the drive shaft 16 and tooth ratio of the wheels 15 and 17 are such that peripheral speed of the guide 11, or more particularly the speed of travel of the notched portion 11b of the guide 11, is greater than the peripheral speed of the slippage roll 8 but slower than that of the slippage roll 9 during initial actuation of the roll 9.

Referring to FIGS. 2 through 4, the overall action of the abovedescribed means is as follows.

In FIG. 2, upon leaving the exposure area 6 both the original document A and the copy paper B initially follow the general contour of the concave guide 10, and when the original document A and copy paper B enter the slippage rolls 8 and 9 the leading edge B1 of the copy paper B is caused to precede the original document A, since the roll 9 is rotated faster at this time. As the copy paper B advances out of the rolls 8 and 9 the leading edge B1 thereof pushes against the arm 19b of the stop 19 which is therefore pivoted to a position in which it no longer engages the separator guide 11, as indicated by the two-dot chain line portion of the drawing. The stop arm 19b being comparatively close to the exit of the rolls 8 and 9, the unsupported portion of the copy paper B extending from the rolls 8 and 9 when the copy paper leading edge B1 contacts the stop arm 19b is very short and hence has good rigidity and strength. Upon disengagement of the stop 19, the weight 20 attached to the separator guide 11 causes the guide 11 to rotate clockwise through an angle $\alpha 1$, whereby the guide notched portion 11a, as indicated by the chain-dot line portion of the drawing, is moved towards a position permitting entry thereinto of the leading edge B1 of the copy paper B, which continues to advance from the rolls 8 and 9, and the toothed portion of the gear wheel 15 attached to the guide 11 is brought into engagement with the drive wheel 17, whereby the separator guide 11 is now forcibly rotated.

Once the stop 19 is disengaged from the stepped portion 11b of the separator guide 11 and rotation of the guide 11 commences, the arm 19a of the stop 19 rides on the periphery of the guide 11, whereby the stop arm 19b is held out of line with the original document A and copy paper B exiting from the rolls 8 and 9, and the stop 19 cannot stop the guide 11 until after one complete revolution of the guide 11 is effected and the guide stepped portion 11b is again brought into a position for engagement by the stop arm 19a. In other words, after initial actuation thereof the stop 19 exerts no pressure on and constitutes no hindrance to movement of the document A or paper B.

Although the copy paper leading edge B1 is currently moving faster than the notched portion 11a of the separator guide 11, it does not yet enter the notched portion 11a at the stage shown in FIG. 2. The leading edge portion of the copy paper B is therefore initially unsupported, and while moving upwards curves to the left as noted earlier, and so approaches the periphery of the separator guide 11 along a line generally tangential thereto.

Referring back to FIG. 2, during this movement of the copy paper B, the original document A also commences to leave the rolls 8 and 9. The material of an original document A employed in this type of photocopying machine being generally much less rigid that of the copy paper B, the original document A is not able to extend without support as far upwards as the copy paper B, but bends to the left and falls naturally onto the exterior of the photocopying machine.

The peripheral speed of the roll 9 still being greater than that of the separator guide 11, the copy paper leading edge B1 gradually catches up with and enters the notched portion 11a of the guide 11, as shown in FIG. 3. While drive conditions remain unchanged, the leading edge B1 of the copy paper B pushes into the notched portion 11a, with the result the subsequent portion of the copy paper B is bowed out. Thus complete engagement of the copy paper leading edge B1 in the separator guide notched portion 11a is ensured, but there is no impact liable to cause buckling of the leading edge B1, and at the same time the bowed portion of the copy paper B acts to push the original document A to the left, so assisting efficient sheet separation. As the separator guide 11 continues to rotate the copy paper B is drawn around an upper quadrant of the transport drum 12 rotating at the same peripheral speed as the slower slippage roll 8.

The same drive conditions are maintained while the separator guide 11 is rotated through a further angle $\alpha 2$, whereby the copy paper leading edge B1 is brought into engagement with the transport drum 12 and forwarding roll 13, the portion of the copy paper B leaving the rolls 8 and 9 is bowed out further and the rearmost portion thereof is extended in a more or less straight line between the exit of the exposure station 6 and entry of the slippage rolls 8 and 9, as shown in FIG. 4. When or just before this point is reached, separate drive to the slippage roll 9 is terminated, as noted above, whereafter the peripheral speed is the same for both rolls 8 and 9, transport drum 12 and forwarding roll 13, this peripheral speed being slower than that of the separator guide 11, which therefore moves out of contact with the copy paper B, forwarding and guiding of the forward portion of the copy paper B now being effected by the transport drum 12 and roll 13. Further rotation of the separator guide 11 brings the untoothed portion 15a of the gear 15 opposite the drive wheel 16, whereby forcible drive of the separator guide 11 is terminated. At the same time, or after a further small amount of rotation of the separator guide 11 due to the weight 20, the stepped portion 11b of the guide 11 is brought to the end of the stop arm 19a, and the stop 19 pivots to again engage the separator guide 11, which is held stationary until a succeeding copy paper B is passed through the rolls 8 and 9. Subsequently the copy paper B is supplied completely between the transport drum 12 and forwarding roll 13, and thence to other requisite stages.

The invention thus offers the following principal advantages.

The force required to be exerted by a sheet of copy paper B is small since it need only be sufficient to overcome a component of the restoring force of the stop 19 and a component of the force exerted by the weight 20. Also since the stop arm 19b is situated near to the exit of the slippage rolls 8 and 9 the leading edge portion of a copy paper B has good rigidity when this force is exerted.

Since the notched portion 11b of the separator guide 11 moves away from the slippage rolls 8 and 9 as an original document A and copy paper B leave the rolls 8 and 9, there is a much reduced possibility of an original document A being able to enter and be engaged in the notched portion 11b, and so be carried through the developing stage D. This applies even if, by mistake, an original document A is loaded alone into the photocopying machine. In addition engagement of the copy paper B by the separator guide 11 is effected gently.

After being disengaged from the separator guide 11, the stop 19 exerts no pressure on the copy paper B, and there is therefore no hindrance to feed-out of the copy paper B from the slippage rolls 8 and 9, and there is no risk of undesired change of direction of the copy paper B.

Figure 7:
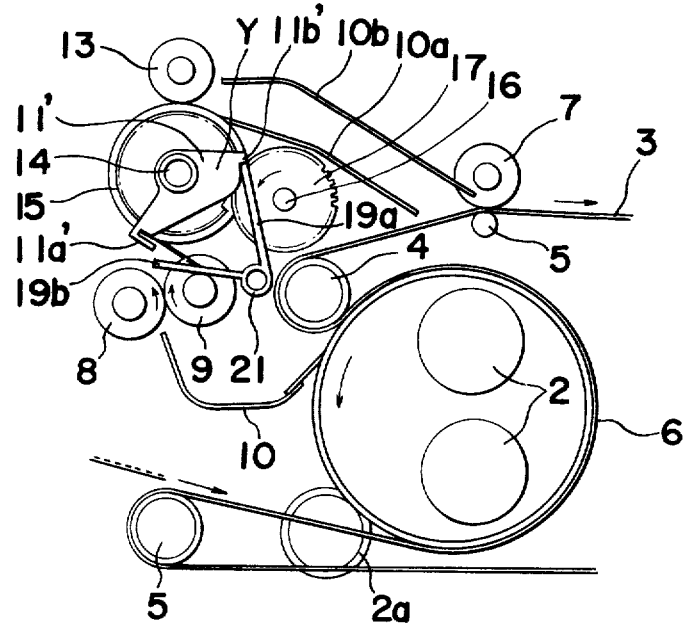
FIG. 7 is a cross-sectional view showing a modification of the sheet separation means of FIG. 1.

It is not of course essential that initial movement of the separator guide 11 upon disengagement of the stop 19 be effected by a separate element such as the weight 20, but this initial movement of the guide 11 may also be effected by providing a guide 11' such as shown in FIG. 7. The separator guide 11' is constituted by an assymetrical disc which is rotatably mounted on the shaft 14, and the center of gravity of which, indicated at y in the drawing, is out of vertical alignment with, and nearer to the stop arm 19a than, the rotational centre of the guide 11' when the stepped portion 11b' of the guide 11' is engaged by the stop arm 19a.

Figure 8:
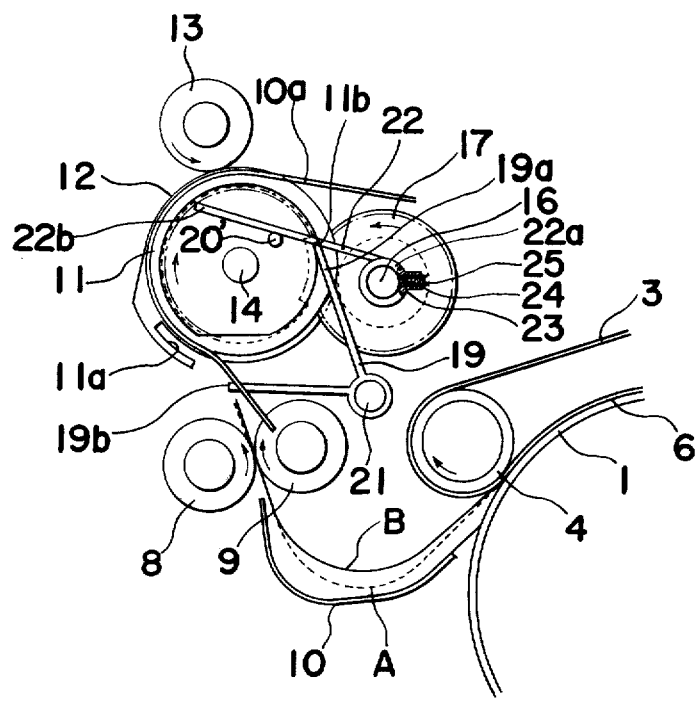
FIG. 8 is a cross-sectional view of a sheet separation means according to another embodiment of the invention.
Figure 9:
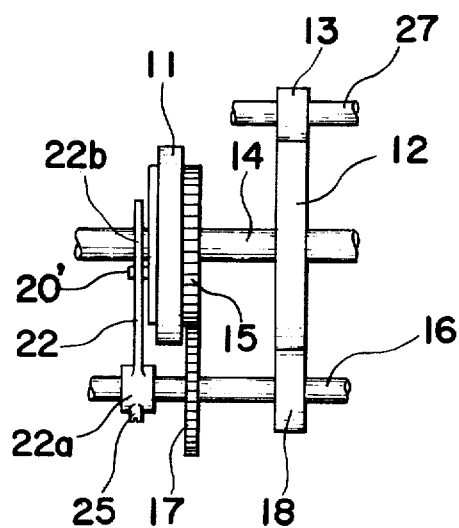
FIG. 9 is a plan view showing the drive mode of a copy paper guide means and transport drum means in the means of FIG. 8.

Referring now to FIGS. 8 and 9 there is shown another modification of the invention in which initial movement of the guide 11 is effected at a speed proportional to actuation speed of other elements in a photocopying machine in which the duration of exposure of a sheet of copy paper B in the exposure system 6 is varied according to the density required to be obtained, or to other factors, and the speed of the slippage rolls 8 and 9, transport drum 12 and other drive and forwarding elements is varied accordingly. In this modification the separator guide 11 is a generally symmetrical element having affixed to the outer side surface thereof a stud 20'. When the guide 11 is engaged by the stop 19, the stud 20' is located to the right of the rotary center of the separator guide 11 and is contacted by the outer end 22b of a straight lever 22, the other end of which is fixedly connected to a sleeve element 22a which fits loosely around, and connects through friction spring 24 to, the drive shaft 16 on which the drive rolls 18 and drive wheel 17 are fixedly mounted. The sleeve element 22a has a small hollow, cylindrical projection portion the outer end of which defines internal threads and in which is mounted an expansion spring 24 the inner end of which presses the friction material 23 onto the shaft 16, and a retainer screw 25 which is screwed into the outer end of the projection portion and is externally adjustable to alter the pressure applied by the spring 24 on the friction material 23. The friction material 23 is suitably made of rubber and the like.

When the separator guide 11 is engaged by the stop 19, since the lever 22 is prevented from moving by the stud 20', the sleeve element 22a is held stationary and the drive shaft 16 rotates inside the sleeve element 22a while contacting the friction material 23. When the stop 19 is pivoted to disengage the separator guide 11, the drive shaft 16, acting through the friction material 23, causes rotation of the sleeve element 22a, whereby the lever 22 is caused to move the stud 20' downwords and so cause rotation of the separator guide 11 to a position bringing the toothed portion of the gear 15 into engagement with the drive wheel 17. Initial rotation of the separator guide 11 of course need not be effected entirely by the lever 22, but may be assisted by a weight 20' attached to the guide 11. Thus the speed of initial rotation of the separator guide 11 is governed by rotary speed of the drive shaft 16 and is therefore proportional to the speed of exit of the copy paper B from the slippage rolls 8 and 9. In other words, if the copy paper B is moving rapidly the notched portion 11a of the separator guide 11 is moved rapidly to an alignment permitting engagement of the leading edge B1 of the copy sheet B, and the rotary speed of the guide 11 is reduced correspondingly when the speed of travel of the copy sheet B is reduced. The lever 22 is rotated through one revolution or more while the copy paper B is being passed around the transport drum 12, and is again halted by the stud 20' when the separator guide 11 is again engaged by the stop 19.

In some cases, even though the distance to be travelled from the slippage rolls 8 and 9 before engagement in the notched portion 11a of the separator guide 11 is greater than can be travelled by an unsupported original document A, electrostatic attraction resulting from frictional contact between the original document A and copy paper B at the junction of the rolls 8 and 9 may be sufficient to cause adherence of the original document A to the copy paper B and consequent engagement of the original document A in the guide notched portion 11b, or transport thereof to the location of the forwarding roll 13. Such a problem is overcome in another embodiment of the invention shown in FIGS. 10 through 12, to which reference is now had. Adjacent to the forwarding roll 13 there is provided a fixed scraper element 26 which has the general shape of an angle piece and comprises a vertical wall portion 26b having a lower end 26a located in a position in which it may be contacted by a portion of the copy paper B which is bowed due to the speed of advance of the copy paper B being greater than the peripheral speed of the separator guide 11. The scraper element 26 acts to cause further bowing of the copy paper B and hence increased pressure to push the original document A away from the copy paper B. If the leading edge A1 of the original document A remains in adherence to the copy paper B subsequent to exit of the document A and paper B from the slippage rolls 8 and 9 the lower end 26a of the scraper vertical wall portion 26b effectively ensures detachment of the original document A from the copy paper B prior to engagement of the copy paper B in the junction of the transport drum 12 and forwarding roll 13.

In this embodiment of the invention, the separator guide 11 has a slightly modified construction and comprises a large diameter portion 11d which includes the notched portion 11a for engagement of the copy paper leading edge B1, and a smaller diameter portion 11e which is fixedly attached to the outer surface of the larger diameter portion 11d and includes the stepped portion 11b engageable by the stop arm 19a and a main peripheral portion on which the stop arm 19a rides during action of the sheet separation means, thereby keeping the stop arm 19b away from the path of travel of the copy paper B. This construction of the separator guide 11 has the advantage that the stop 19 may be smaller and so requires less restoring force to be overcome by the copy sheet B.

Figure 10:
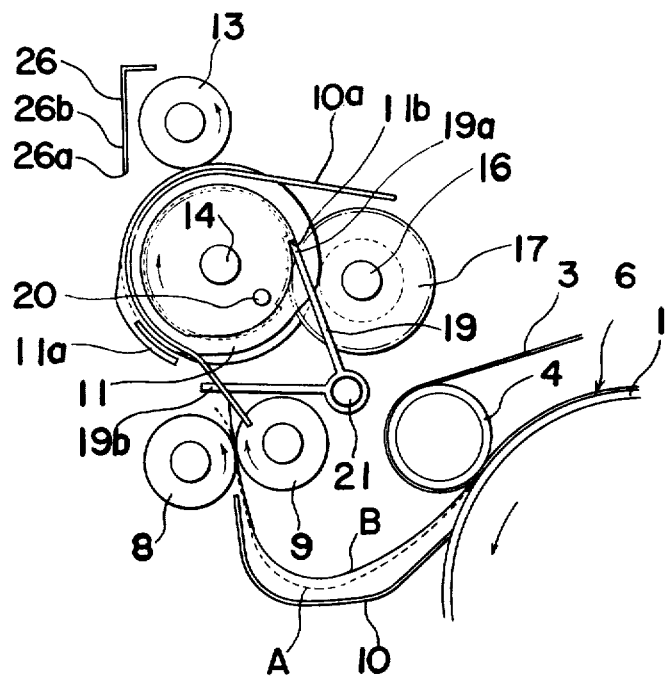
FIGS. 10 and 11 are cross-sectional views showing different stages of sheet separation by a means according to another embodiment of the invention.
Figure 11:
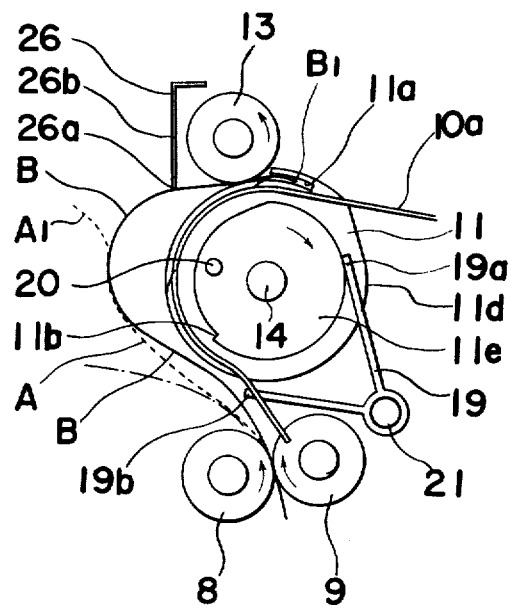
Figure 12:
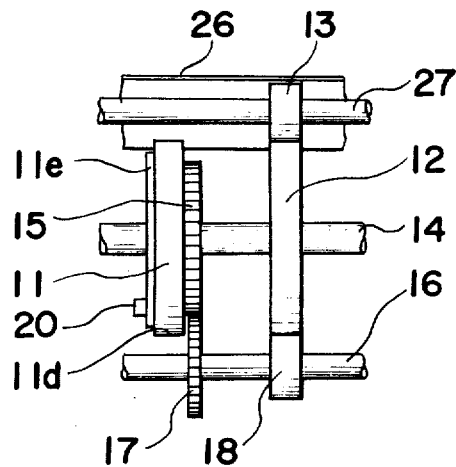
FIG. 12 is a plan view showing the mode of drive of the means of FIGS. 10 and 11.
Figure 13:
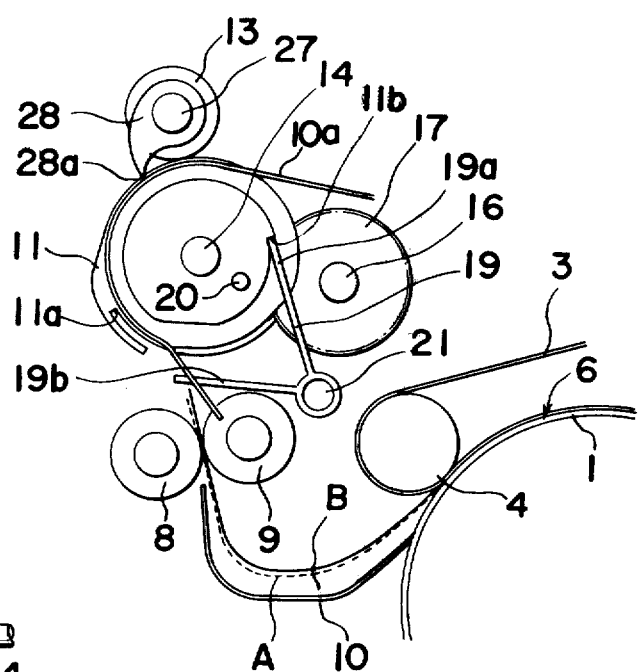
FIG. 13 is a cross-sectional view of a modification of the means of FIGS. 10 and 11.
Figure 14:
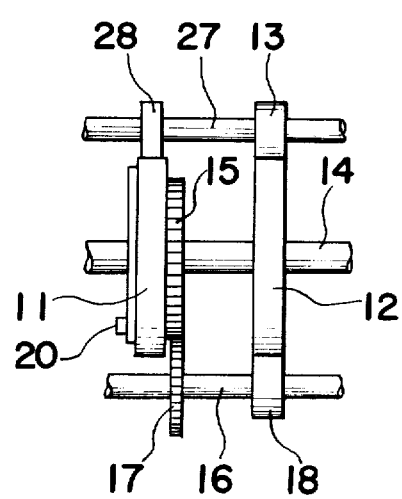
FIG. 14 is a plan view showing the drive mode of the means of FIG. 13.

FIGS. 13 and 14, show a modification of the embodiment of FIGS. 10 through 12 in which one or more pawl elements 28 having pawl tips 28a are loosely mounted on a rotary shaft 27 on which the forwarding rolls 13 are fixedly mounted, the pawl elements 28 being so weighted that the tips 28a thereof will ride on the outer surface of a sheet of copy paper B prior to arrival thereof at the location of the forwarding rolls 13. Needless to say, the pawl elements 28 may be fixedly mounted on independent support means.

What is claimed is:

1. In a photocopying machine comprising a pair of slippage rolls through which an original document and a sheet of copy paper are passed subsequent to exposure of the copy paper, the rotary speed of constituent rolls of said pair of slippage rolls being such that said copy paper is caused to precede said original document at least during initial passage of said original document and said copy paper through said slippage rolls so as to separate, automatically said copy paper from said original document, a sheet separation device comprising:

separator guide means including at least one plate element and a support shaft on which said plate element is freely rotatable, said plate element having a peripheral notched portion in which the leading edge portion of said copy paper is engaged so as to be guided along an orbit out of the path of the original document, stop means which engage said separator guide means to hold said notched portion at a position to face the leading edge portion of said copy paper exiting from said slippage rolls, and, in turn, is disengaged from said separator guide means by being contacted by the leading edge portion of said copy paper, initial drive means coupled to said separator guide means for forcibly rotating said separator guide means in a direction of disengaging said notched portion from the leading edge portion of said copy paper when said stop means is disengaged from said separator guide means, and subsequent drive means coupled to said separator guide means for continuously rotating said separator guide means at a speed lower than the peripheral speed of said slippage rolls to the waiting position where said separator guide means is again engaged with said stop means.

2. A sheet separation device as recited in claim 1, wherein said stop means comprises a stop including an engaging portion for holding said separator guide means at the waiting position and a driven lever projecting into the path of said copy paper between the notched portion of said separator guide means at the waiting position and said slippage rolls, said stop being rotatably mounted and always urged in a direction for bringing said engaging portion into engagement with said separator guide means.

3. A sheet separation device as recited in claim 1, wherein said subsequent drive means comprises a driven gear fixedly mounted on said separator guide means and having a toothless portion, a drive gear, and a drive shaft which is rotated at a speed corresponding to that of the exposure of the copy paper and on which said drive gear is mounted, said driven gear being meshed with said drive gear to rotate at a speed such that separator guide means is driven slower than said slippage rolls.

4. A sheet separation device as recited in claim 1, wherein said initial drive means comprises a member for urging said separator guide means at the waiting position to rotate in a direction for guiding said copy paper.

5. A sheet separation device as recited in claim 4, wherein said member comprises a weight provided on a portion of said separator guide means.

6. A sheet separation device as recited in claim 3, wherein said initial drive means comprises a lever having one end frictionally engaged with said drive shaft and the other end of which is engaged with said separator guide means for rotating said separator guide means.

7. A sheet separation device as recited in claim 1, wherein said initial drive means comprises an assymetric portion of said separator guide means which, when the separator guide means is at the waiting position, urges by the weight thereof the separator guide means to rotate in the direction for guiding said copy paper.

8. A sheet separation device as recited in claim 1, further comprising a detachment means provided adjacent said separator guide means for separating the original document travelling with the copy paper from the copy paper in the looped, curved position of the copy paper formed by means of the difference in speed between said separator guide means and said slippage rolls.

9. A sheet separation device as recited in claim 8, wherein said detachment means comprises a pawl element rotatably mounted above said separator guide means.

10. In a photocopying machine comprising a pair of slippage rolls through which an original document and a sheet of copy paper are passed subsequent to exposure of the copy paper, the rotary speed of constituent rolls of said pair of slippage rolls being such that said copy paper is caused to precede said original document at least during initial passage of said original document and said copy paper through said slippage rolls, and transport and forwarding means for directing said copy paper to requisite stages for postexposure treatment of said copy paper, a sheet separation means comprising;

separator guide means including at least one plate element and a support shaft on which said plate element is freely rotatable, said plate element having a center of gravity which is eccentric with respect to the rotary axis of said separator guide means, and having a peripheral notched portion which is disposed on a line which is generally tangential with respect to the periphery of said separator guide means and which will engage the leading edge portion of said copy paper exiting from said slippage rolls, and further having a peripheral stepped portion, a pivotally mounted stop means including a first portion which when in a first position will engage said peripheral stepped portion of said separator guide means, whereby said separator guide means is held stationary with said notched portion of said separator guide means being near the exit of said slippage rolls and being inclined with respect to the path followed by said copy paper exiting from said slippage rolls and said center of gravity of said separator guide means being out of vertical alignment with and nearer to said first portion of said stop means than the rotary axis of said separator guide means when said separator guide means is held stationary by said stop means, and said stop means normally pivoting to said first position, and a second portion which when said stop means is in said first position lies between the exit of said slippage rolls and said periphery of said separator guide means and is contacted and acted upon by the leading edge portion of said copy sheet exiting from said slippage rolls, whereby said stop means is disengaged from said separator guide means and said separator guide means is rotated due to the action of said center of gravity thereof moving to a position of equilibrium, and said notched peripheral portion of said separator guide means is moved towards a position of alignment permitting entry thereinto and engagement thereby of said leading edge portion of said copy sheet exiting from said slippage rolls, gear drive wheel means which is actuated during actuation of said slippage rolls, gear wheel means fixedly attached to said separator guide means and comprising a toothed peripheral portion which is engageable by said drive wheel means when said separator guide means is rotated from said stationary position due to said action of said center of gravity thereof subsequent to said disengagement of said stop means therefrom, and a toothless portion which is located facing said drive wheel means when said separator guide means is held in said stationary position by said stop means.

11. Sheet separation means as recited in claim 10, which further comprises a contact stud element fixedly attached to a side surface portion of said separator guide means, and a lever the outer end of which contacts said stud element when said separator guide means is engaged by said stop means, a sleeve element to which the opposite end of said lever is fixedly attached, a drive shaft which is rotated simultaneously with, and at a speed proportional to that of other photocopying machine elements for effecting movement of said original copy and of said copy paper through said photocopying machine, elastically constrained friction material around said drive shaft, and said sleeve element being loosely mounted around said friction material.

12. A sheet separation means as recited in claim 10, which further comprises a detachment means which is provided adjacent to the path of travel of said copy sheet subsequent to engagement of said leading edge portion thereof by said notched portion of said separator guide means and which contacts the surface of said copy paper which is initially overlaid by said original document and insures detachment of said original document from said copy paper before the forwarding means forward the copy paper to subsequent stages.

* * * * *